United States Patent
Felts

(10) Patent No.: US 8,589,903 B2
(45) Date of Patent: *Nov. 19, 2013

(54) PATCH ATTACHMENT FACILITY

(75) Inventor: David Felts, Denville, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 790 days.

This patent is subject to a terminal disclaimer.

(21) Appl. No.: 12/127,950

(22) Filed: May 28, 2008

(65) Prior Publication Data

US 2009/0144716 A1 Jun. 4, 2009

Related U.S. Application Data

(60) Provisional application No. 60/992,267, filed on Dec. 4, 2007.

(51) Int. Cl.
*G06F 9/44* (2006.01)

(52) U.S. Cl.
USPC ........... 717/169; 717/170; 717/174; 717/175; 709/223

(58) Field of Classification Search
USPC .................................. 717/168–178; 709/223
See application file for complete search history.

(56) References Cited

U.S. PATENT DOCUMENTS

| 5,504,852 | A | 4/1996 | Thompson-Rohrlich |
| 5,553,290 | A | 9/1996 | Calvert et al. |
| 5,953,533 | A | 9/1999 | Fink et al. |
| 6,282,711 | B1 | 8/2001 | Halpern et al. |
| 6,360,255 | B1 | 3/2002 | McCormack |
| 6,370,686 | B1 | 4/2002 | Delo et al. |
| 6,381,742 | B2 | 4/2002 | Forbes et al. |
| 6,615,405 | B1 | 9/2003 | Goldman et al. |
| 6,681,391 | B1 | 1/2004 | Marino et al. |
| 6,698,018 | B1 | 2/2004 | Zimniewicz et al. |
| 7,013,461 | B2 | 3/2006 | Hellerstein et al. |
| 7,076,496 | B1 | 7/2006 | Ruizandrade |
| 7,222,341 | B2 | 5/2007 | Forbes et al. |
| 7,266,817 | B1 | 9/2007 | Barrett |
| 7,370,092 | B2 * | 5/2008 | Aderton et al. ............... 709/220 |
| 7,478,093 | B2 | 1/2009 | Moulckers et al. |
| 7,487,536 | B2 * | 2/2009 | Sakurai et al. ..................... 726/4 |
| 7,519,964 | B1 * | 4/2009 | Islam et al. .................... 717/177 |
| 7,613,789 | B2 | 11/2009 | Cacenco et al. |
| 7,620,948 | B1 * | 11/2009 | Rowe et al. ..................... 717/171 |
| 7,640,542 | B2 | 12/2009 | Herenyi et al. |
| 7,703,090 | B2 * | 4/2010 | Napier et al. ................. 717/168 |

(Continued)

FOREIGN PATENT DOCUMENTS

WO WO 00/77614 A2 12/2000

OTHER PUBLICATIONS

OSGi Service Platform Release 2, Open Services Gateway Initiative, Oct. 2001, 7 pages.

(Continued)

*Primary Examiner* — Lewis A Bullock, Jr.
*Assistant Examiner* — Tina Huynh
(74) *Attorney, Agent, or Firm* — Fliesler Meyer LLP

(57) ABSTRACT

A computer-based system can comprise a patch management system to a load patch to a software program; and an installer to install components of the software program. The installer can interpret metadata to instruct the patch management system to automatically load the patch to the software program.

17 Claims, 6 Drawing Sheets

(56) References Cited

U.S. PATENT DOCUMENTS

| | | | |
|---|---|---|---|
| 7,930,273 B1* | 4/2011 | Clark et al. | 707/638 |
| 7,984,436 B1 | 7/2011 | Murray | |
| 2002/0010910 A1 | 1/2002 | Crudele et al. | |
| 2002/0100036 A1* | 7/2002 | Moshir et al. | 717/173 |
| 2002/0129356 A1* | 9/2002 | Hellerstein et al. | 717/177 |
| 2002/0188941 A1 | 12/2002 | Cicciarelli et al. | |
| 2003/0051236 A1 | 3/2003 | Pace et al. | |
| 2003/0145317 A1 | 7/2003 | Chamberlain | |
| 2004/0034850 A1 | 2/2004 | Burkhardt et al. | |
| 2004/0210653 A1* | 10/2004 | Kanoor et al. | 709/223 |
| 2005/0015761 A1 | 1/2005 | Chang et al. | |
| 2005/0066324 A1 | 3/2005 | Delgado et al. | |
| 2006/0064382 A1 | 3/2006 | Cognigni et al. | |
| 2006/0080656 A1* | 4/2006 | Cain et al. | 717/174 |
| 2006/0101450 A1* | 5/2006 | Datta et al. | 717/168 |
| 2006/0123409 A1 | 6/2006 | Jordan, III et al. | |
| 2006/0130047 A1 | 6/2006 | Burugapalli | |
| 2006/0161916 A1 | 7/2006 | May et al. | |
| 2006/0184926 A1 | 8/2006 | Or et al. | |
| 2006/0206757 A1* | 9/2006 | Russell et al. | 714/9 |
| 2006/0224544 A1 | 10/2006 | Keith, Jr. | |
| 2007/0033586 A1* | 2/2007 | Hirsave et al. | 717/174 |
| 2007/0038642 A1* | 2/2007 | Durgin et al. | 707/10 |
| 2007/0169079 A1* | 7/2007 | Keller et al. | 717/168 |
| 2007/0169114 A1 | 7/2007 | Birk et al. | |
| 2007/0289027 A1 | 12/2007 | Johnson et al. | |
| 2008/0046882 A1 | 2/2008 | Blackhouse | |
| 2008/0127175 A1 | 5/2008 | Naranjo et al. | |
| 2008/0163192 A1* | 7/2008 | Jha et al. | 717/173 |
| 2008/0163199 A1 | 7/2008 | Rao et al. | |
| 2008/0209400 A1 | 8/2008 | Parker | |
| 2008/0222626 A1* | 9/2008 | Kumar Hirsave et al. | 717/168 |
| 2008/0235633 A1 | 9/2008 | Ghiloni | |
| 2009/0144726 A1 | 6/2009 | Felts | |
| 2009/0144727 A1 | 6/2009 | Felts | |
| 2009/0144728 A1 | 6/2009 | Felts | |
| 2009/0183150 A1 | 7/2009 | Felts | |
| 2009/0259999 A1* | 10/2009 | Srinivasan | 717/170 |

OTHER PUBLICATIONS

HP User's Guide, "Software Package Builder 2.0 User's Guide for HP_UX 11i and 11i v2", Edition 1, Sep. 2004, pp. 1-86.

HP, "Packaging Applications in Software Distributor Format Using Software Package Builder", pp. 1-22.

Cederqvist et al. Version Management with CVS for CVS 1.11.23, pp. 1-190.

EMCO MSI Package Builder Tutorial, http://ww.emco.is/products/msi-package-builder/tutorial, Nov. 2008, 1 page.

Novell, Novell ZENworks Software Packaging, http://www.novell.com/products/zenworks/softwarepackaging/overview.html., Nov. 2008, 1 page.

HP, "Software Distributor Administration Guide for HP-UX 11i HP Computers", Edition 3, Jun. 2002, pp. 1-518.

IBM, Packaging Software with RMP, Part 1, http://www.ibm.com/developerworks/librarv/I-rpml, Nov. 2008, pp. 1-6.

* cited by examiner

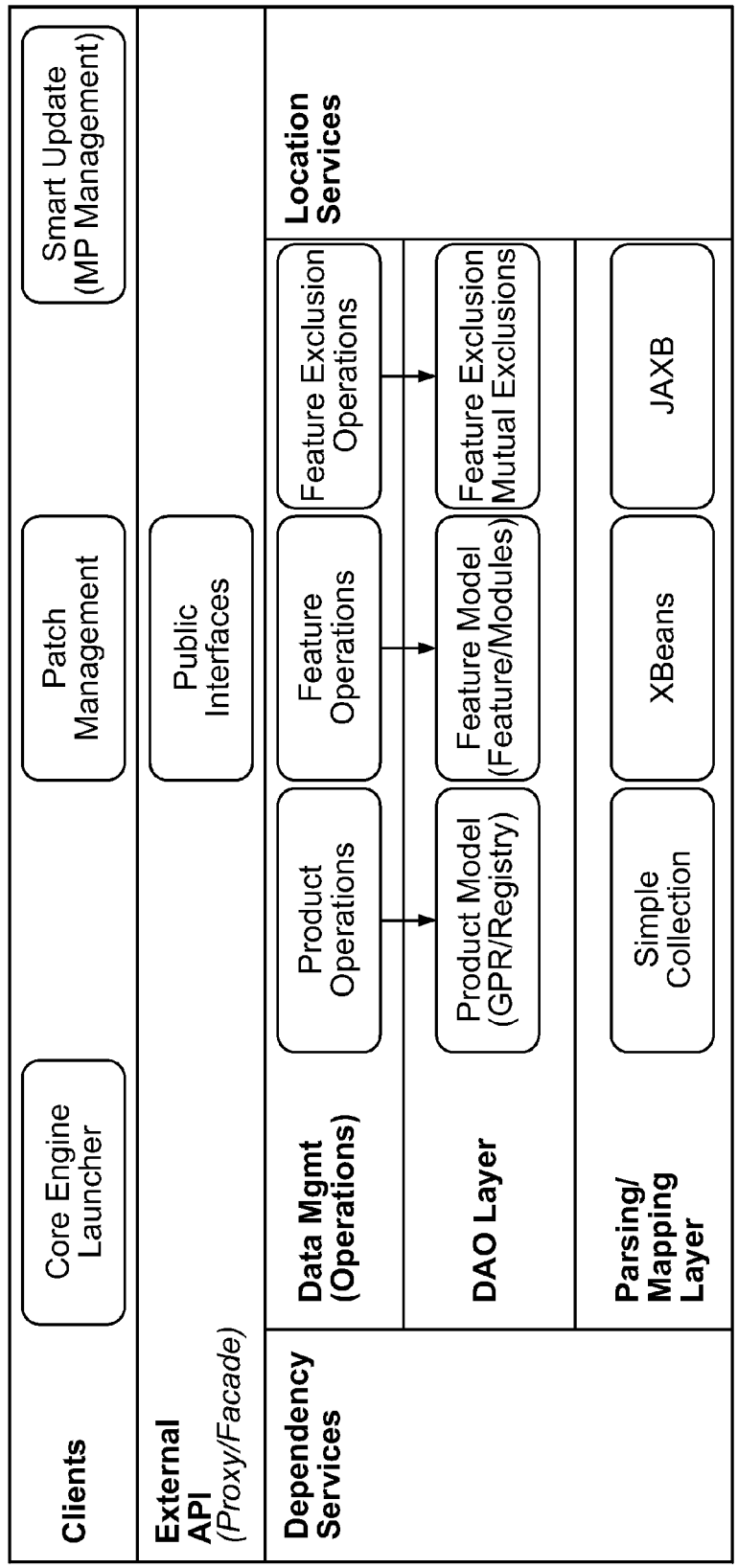

PATCH ATTACHMENT FACILITY

CLAIM OF PRIORITY

This application claims priority to U.S. Provisional Application No. 60/992,267 entitled "PATCH ATTACHMENT FACILITY" by David Felts, filed Dec. 4, 2007, which is hereby incorporated by reference.

BACKGROUND

Installers are used to install software programs onto computer. In order to use software programs, the program components are typically unpacked and the relevant information placed on the computer, taking account of variations between computers, and customized settings input by the user.

BRIEF DESCRIPTION OF THE FIGURES

FIGS. 5A-5C illustrate product to component mapping, component to feature mapping, and feature to module mapping of one exemplary embodiment.

FIG. 6 illustrates an exemplary provisioning architecture.

DETAILED DESCRIPTION OF EXEMPLARY EMBODIMENTS

Figure 1:
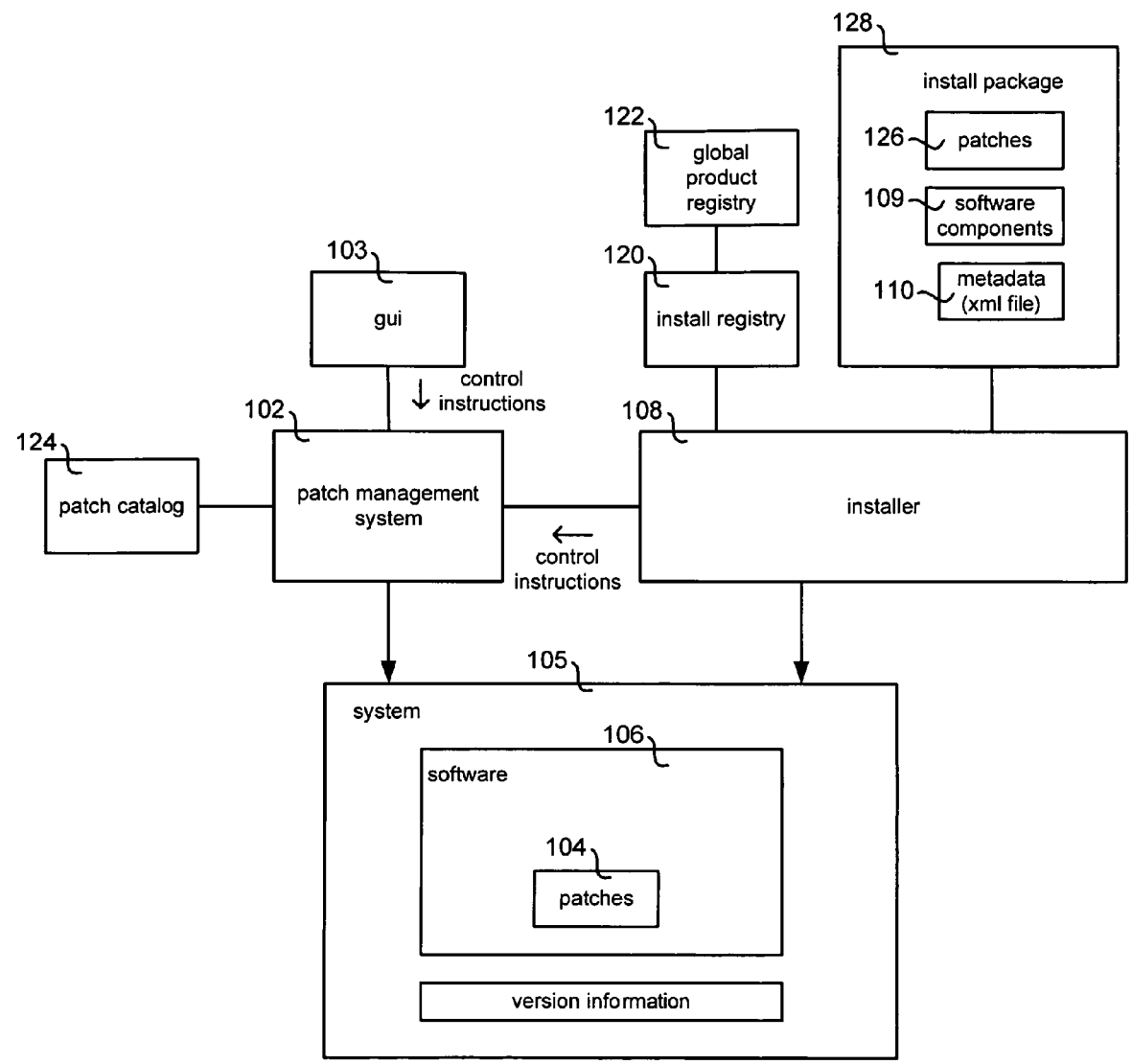
FIG. 1 is a diagram showing the use of metadata so that an installer can automatically install patches to a software product.

In one embodiment, the patch management system 102 is used to load patches 104 onto software 106. One way to do this is to use a graphical user interface (GUI) 103 to select the patches to load. The patch management system can keep track of the patches as well as the dependencies of the patches with the components of the software 106. Details of one embodiment of a patch management system are described in the patent application entitled "PATCH MANAGEMENT SYSTEM", by David Felts, filed Oct. 6, 2006, U.S. patent application Ser. No. 11/539,261 incorporated herein by reference.

It is not always desirable for a user to be required to control the loading of the patches through GUI 103. In some cases, it is desirable that the software be installed with the patches automatically loaded onto the system.

One embodiment of the present invention is a patch management system 102 to load patches 104 to a software program 106. An installer 108 can be used to install components 109 of the software program 106. The installer 102 can be adapted to interpret metadata 110 to instruct the patch management system 102 to automatically load patches 104 to the software program 106. The software components and patches can be loaded in a combined operation.

The installer 108 can use the metadata 110 to determine how to instruct the patch management system to load the patches. In one embodiment, the patch management system 102 can receive the same set of control instructions from installer 108 as from the GUI 103. This can ensure that there is no difference in the patch loading behavior whether it is controlled by the GUI 103 or installer 108.

The installer 108 and the patch management system 102 can update version information based on loaded software components and patches. For example, one field of a version number can indicate any loaded patches. This can allow support operations to understand what is loaded on the system 105.

An install repository 120 can indicate what software components are stored on a system and be used to keep track of component dependence. The install registry can get information from a global product registry 122 that can indicate all of the software component dependencies of an entire software product line. Dependencies can indicate what components need to be loaded together as well as what components conflict. In one embodiment, a patch catalog 124 is analogous to the global product registry and indicates all of the patches as well as the patches dependencies.

The metadata 110 can be used to determine the patches to place in an install package 128. The install package 128 can be used by the installer and the patch management system 102 to load the patches.

The metadata can be a XML file. The XML file can indicate what patches to load in what order.

In one embodiment, the installer 108 checks the metadata 110 and the install registry 120 to determine what patches 126, and additionally what components 109, that need to be loaded. The components 109 can be loaded by the installer and the installer 108 can instruct the patch management system 102 to load the patches.

Figure 2:
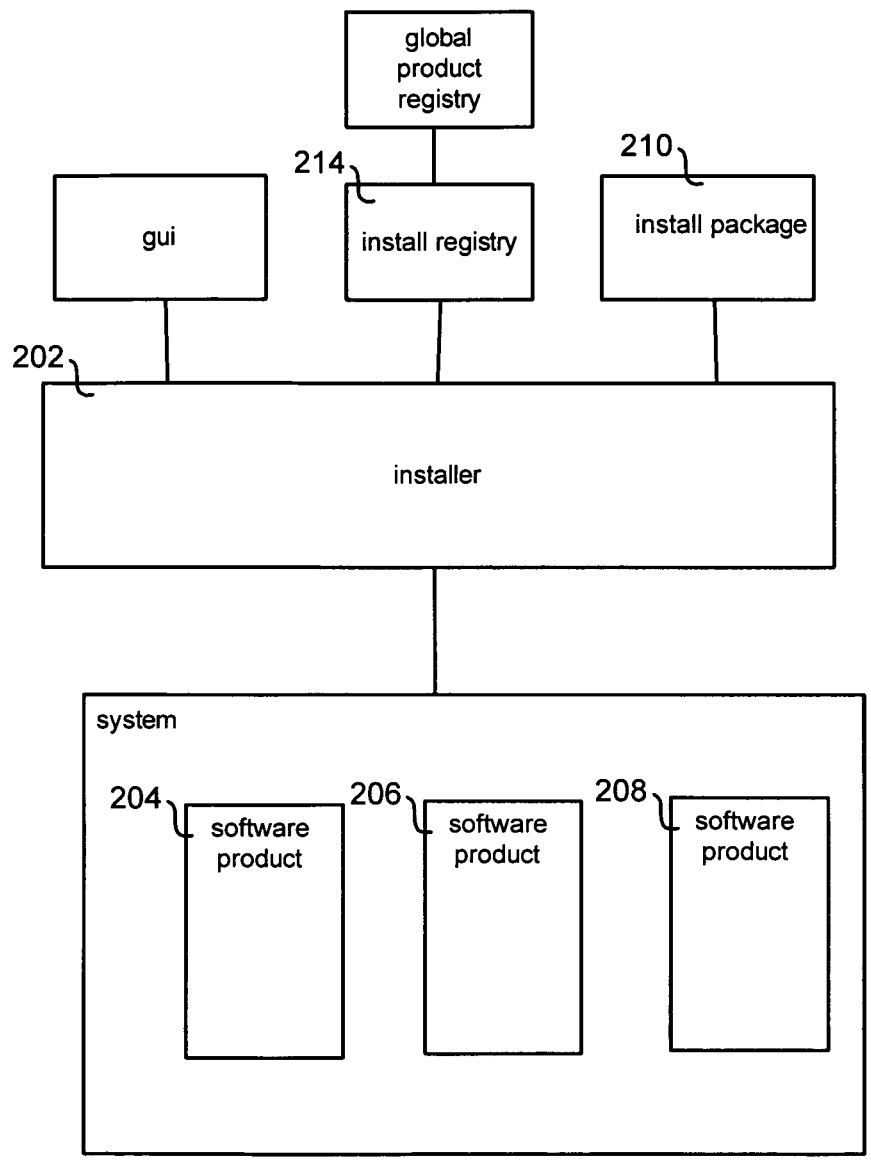
FIG. 2 is a diagram that shows an installer for a combined installation of multiple software products.
Figure 3:
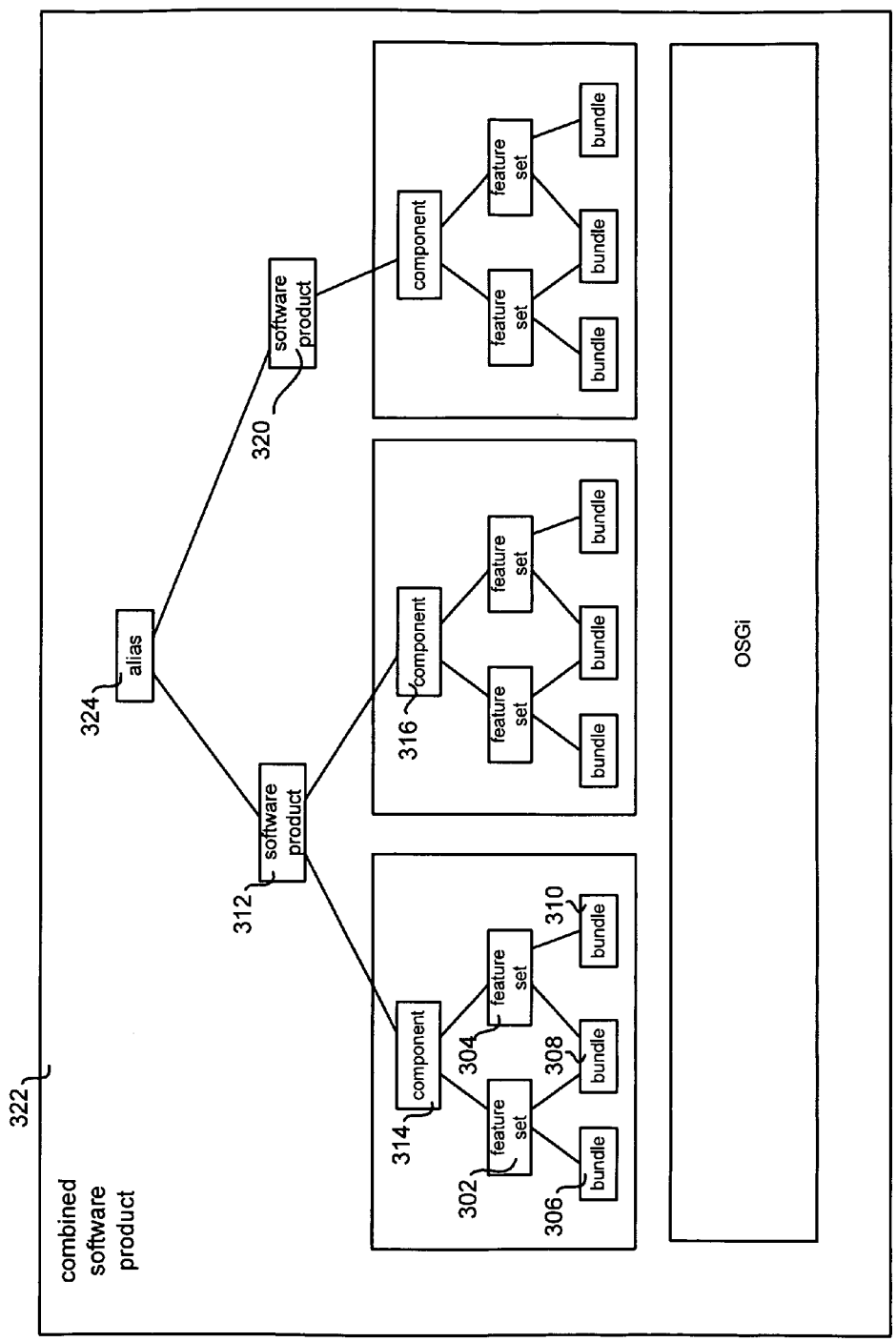
FIG. 3 is a diagram that shows the organization of the software product using feature sets.

In the example of FIG. 2, the installer 202 uses the install package 210 to load the multiple software products 204, 206 and 208 onto system 212. The install package can include alias information indicating the multiple software products. The installer can determine from the alias information that a combined installation is to be done.

The installer 202 can check an install registry 214 before doing the installation. The install registry 214 can indicate what is installed on system 212. The installer 202 can determine how to install the multiple software products using the install registry 214. For example, the installer can check for and deal with any dependencies in the software product to be loaded.

In one example, if a software product is already installed on system 212, the installer can skip installing that software product in the combined installation.

It is desirable to have an installer 202 that can install multiple software products in a combined operation.

In one embodiment, installer 202 does a combined installation of multiple software products 204, 206 and 208. The installer 202 can do a combined pre-install phase, a combined install phase, and a combined post-install phase for the multiple software products 204, 206 and 208.

The combined pre-install phase can be a phase in which the user input for the multiple products can be obtained. For example, configuration information for the multiple software products can be obtained from the user at a single time.

The post-install can include the display of an indication of how the install went. For example, the post-install can be a display that the combined install was successful.

In one embodiment, the multiple products can be hidden behind an alias that is used for marketing. The user need not even be aware of the identity of the different software products.

In one embodiment, metadata identifying the multiple software products can be provided to the installer. This can be alias metadata that points to the multiple software products.

In one embodiment, the loading of the software products can include the automatic loading of patches using the system shown in FIG. 1.

The software products can each be made of components. The multiple software products can be combined using an alias.

A software product 312 can comprise multiple components 314 and 316. At least one component 314 can comprise multiple feature sets 302 and 304. The feature sets can each define multiple OSGi bundles. The installation can include installing the OSGi bundles as indicated by the feature sets. The runtime can also include loading the OSGi bundles as indicated by the feature sets.

An installer can install the OSGi bundles as indicated by the feature sets.

Multiple products 320 and 312 can form a composite product 322. The composite product 322 can be defined by an alias 324.

The software product 312 can be patched by switching OSGi bundles. For example, each bundle affected by a patch can be replaced by a new bundle.

An installer can use an alias 324 to indicate a combined software program 322. The combined program 322 can include multiple software products 320 and 312, the software products 320 and 312, each being independently runnable. The alias 324 can be used by the installer system to install the multiple software products automatically.

The software product 312 comprises components 314 and 316. The components 312 and 314 can include feature sets 302 and 304. The feature sets 302 and 304 can include modules, such as OSGi bundles 306, 308 and 310.

Exemplary Non-Limiting Embodiment

An exemplary non-limiting example showing one system using concepts of the present invention is described below.

A "Global Product Registry" (GPR) model can define company-wide products, product versions, components and maintenance levels, along with related attributes governing dependencies and distribution aspects. A File Definition model can contain the blueprint for file and directory installation, mapping each file in the installer payload to its final destination on the customer's system. Many attributes, including rules and filters, can govern the mechanics of file installation. An XML file can embody the File Definition model and a separate file can exist for each product. The File Definition model can be an important part of the extended Product Provisioning Model. The File Definition model is critical to a change required to support shared modules.

Software companies have a growing need for greater business agility to opportunistically create bundled software distribution packages that map to Stock Keeping Units (SKU's) consisting of new permutations of available products.

Marketing and executive management require the ability to create arbitrary external product brand names and versions, while standard product provisioning operations require normalized internal product names and versions. Structured product provisioning data can preserve the ability to upgrade and patch products consistently, enable customer provisioning automation, and maintain reasonable supportability of the products.

Software companys' current architectural directions dictate modularity and modular product distributions. Product distributions can now contain modules, also known as bundles in OSGi parlance. Modules are very granular. Consequently modules can require (1) a higher level intuitive semantic for purpose of dependency declaration between function module groups as well as (2) a simplified method of starting OSGi-based runtime applications.

The Core Engine Launcher can require an interface to return module lists based on requests for published feature versions. The interface can resolve dependencies and order modules appropriately by start level. The model used by the interface can be consistent with that used by installation to ensure that runtime dependencies are backed by installed media.

Figure 4A:
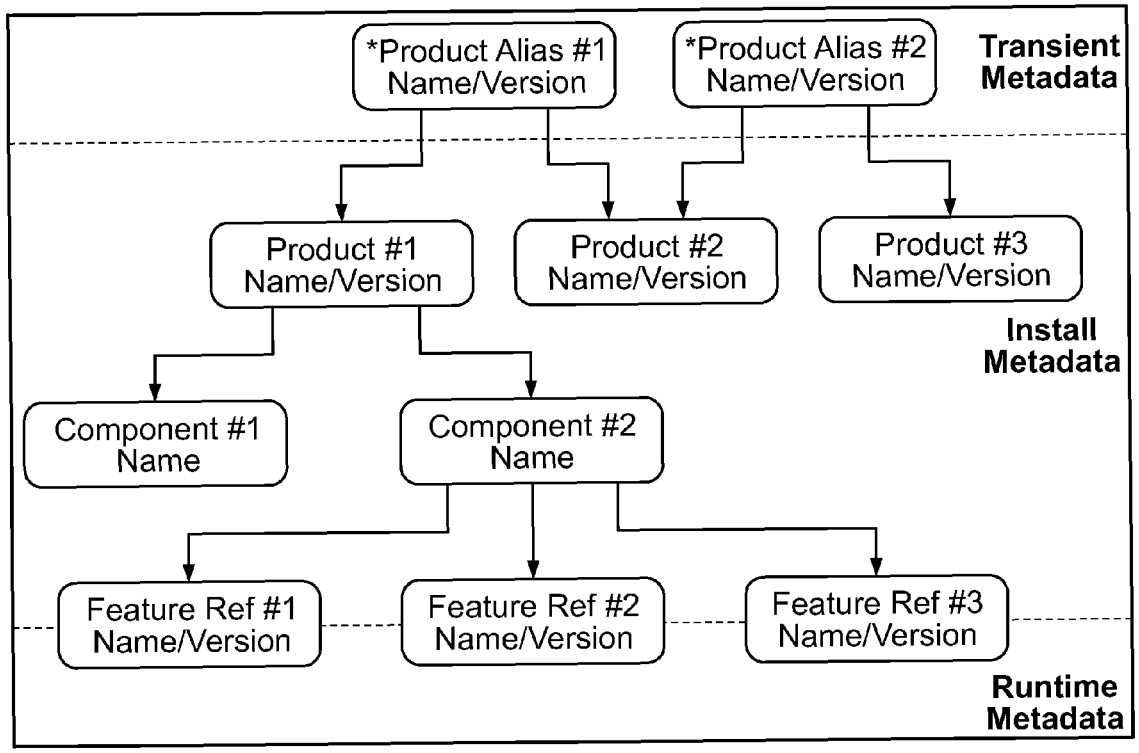
FIGS. 4A-4B illustrate product and feature metadata of one embodiment.

FIG. 4A shows a diagram of the metadata associated with a product of one embodiment. Product Alias need not be part of the hierarchical product tree. A product alias can refer to one or more products, but this need not imply parentage. In one embodiment, the official root of the hierarchical product model begins with a product element.

Figure 4B:
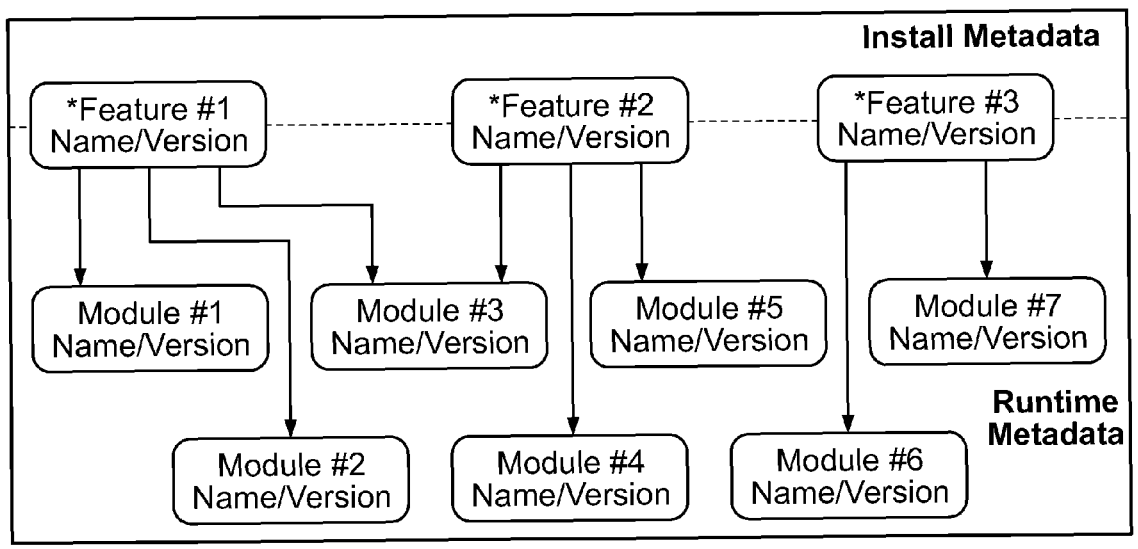

FIG. 4B shows a diagram that shows the relation of Feature Sets and Modules. The Feature Model can be joined to components in the Product Model via feature-refs (feature references). Think of components as being composed of features, rather than dependent on them, i.e. features depend on features, but do not depend on any entity in the product model. This provides loose coupling between the Product Model and Feature Model, mapping runtime and install elements.

Provisioning code can depend on a product registry file. The product registry file can be located in a Home folder. The registry can contain information about products and the environment upon which products depend, e.g. specification of necessary virtual machines. Many values and related semantics can correspond to values in the GPR however the registry is based on a separate model. This can be reflected in processing prevalent throughout the install framework. One embodiment of the new design calls for convergence of the GPR and registry models, adding critical information to the Home registry and simplifying processing algorithms in the install framework. This can address a long standing business requirement to enforce cross-product dependencies during un-installation. Further, this can facilitate an interface to create a list of modules along with normalized start levels based on activation requests for products, components or specific features. References to the GPR in this document are synonymous with references to the Product Model.

A Product Alias element can be added to the Product Provisioning Model, referencing one or more products. This can provide a loose coupling between the external market-oriented product name and version and the internal product names and versions. The internal product names and versions can be captured in the registry and used for all code-based decisions during installation and other provisioning related activities.

A concrete Feature Model can be added to the Product Provisioning Model. A feature can be referenced by components in the Product Model and serves as a bridge linking install and runtime aspects of an artifact or module. Features can be versioned and contain a group of versioned modules.

Modules can be grouped under features. Modules can be designated as "shared". Shared modules need not belong to any specific product but rather can be targeted for distribution with two or more products requiring the same unit of functionality.

Product aliases can allow marketing flexibility without impact to normalized, consistent methods of identifying software artifacts for purpose of installation, un-installation, upgrade and patch. The product alias name and version may be unreliable for purpose of code and tool based detection and automation, i.e. the versioning scheme may not follow a rational, uniform syntax or be predictable with a consistent, monotonic, incrementing of the version number.

A product alias enables creation of a product suite from a group of products. Moreover this layer of abstraction removes the need to modify product names and versions with each new suite permutation. This facilitates a consistent semantic for customer use, e.g. when contacting support or interfacing with a Patch Management system.

Product aliases can be defined in the GPR. The GPR can contain a separate section for each product alias, which in turn contains references for each included product.

The term product defines the lowest level of granularity for a complete software offering targeted for customer consumption. Note that more than one SKU may be defined for a given product based on product features enabled and usage characteristics of the features, e.g. constraints placed on features to restrict usage to a development scenario.

The product element can serve as a container for a group of components. In order to effectively deliver a product for customer consumption, components can be grouped and referred to by an immutable name and version. This is done in order to develop and release product according to a standard lifecycle methodology. Orderly and automated installation, un-installation, upgrade and patching of products also uses a normalized naming and versioning scheme. Moreover, this facilitates a consistent interface for customers and effective customer support.

A product may contain a mixture of components used exclusively by this product as well as components containing "shared modules" that can be used by multiple products.

Products can be defined in the GPR. The GPR can contain a separate section for each version of a given product, including service/maintenance pack versions.

The components can define a functionally specific group of software executables and artifacts designed to provide customized product installation options. Installation options enable various customer use cases. A product can contain optional features that are appropriate only for specific use cases. Providing the ability to optionally install enables a reduction in the footprint on disk and may reduce the download footprint. Optional installation may also facilitate a development versus production product image. In the case of a production installation, it may be necessary to avoid installation of certain components whose presence represents a security vulnerability according to local policy.

Components can define dependencies on other components, including components belonging to different products. Multiple dependencies can be expressed using a logical "and" or "or" semantic. Regular expressions can also be supported.

Components can also contain feature references. Features in turn can define dependencies, which are inherited by the parent component. Based on dependencies, components may be automatically selected or de-selected in installation and un-installation scenarios. Moreover, installation and un-installation errors or alerts can be generated when dependencies span products. Features are fully defined in the following section. Components can be defined in the GPR.

A feature can define a container element for modules as well as inter-feature dependencies. Features can be versioned as they are standalone entities, not subject to any higher level element. A particular feature version can contain one to many module versions that are functionally related and certified as compatible. Features can be the primary entity used to identify modules to start in an OSGi environment. Features can also be the primary vehicle used to distribute certified software combinations internally for consumers of the Core Engine.

Feature Definitions can adhere to a schema-based model allowing definition of constituent modules and feature dependencies. Each module entry can contain a module name, optional start level and shared module indicator. When the Core Engine launcher processes module entries, the module start level determines the sequence of module activation. The model also permits declaration of dependency elements capturing relationships between feature versions.

Several files can support feature definition and dependencies. An XML Feature Definition file embodies the Feature Model. A separate file can exist for each feature version. In one embodiment, it can adhere to the naming convention <featurename>_<4positionversion>.xml. A jar file can be automatically generated during an installer build for each feature version. The jar file can consist solely of a manifest with a classpath entry containing all modules listed in the Feature Definition file. Non-OSGi based runtime systems can use the jar files to systematically create the appropriate classpath. The jar can adhere to the naming convention <featurename>_<4positionversion>.jar. Lastly, optional feature-set jars can hold manifest classpath references to a collection of related feature jars. A feature-set jar can adhere to the naming convention <featurename>.feature.set_<4positionversion>.jar.

Feature dependencies can define mandatory relationships between groups of software executables and artifacts. Multiple dependencies can be expressed using a logical "and" or "or" semantic. Regular expressions need not be required for features, as dependencies can be very direct. In one embodiment by contrast, regular expressions can be supported for the component element, as both products and components are expressed in dependency relationships associated with components.

Logical "not" dependencies can enable handling of mutual exclusion use cases. A Feature Exclusion model can capture these exclusions. Separate modeling of exclusions can avoid heuristics and performance problems inherent with inclusion of this dependency type in the base dependency graph. Exclusions can be processed after completion of base graph processing.

Feature dependencies can be independent of OSGI-based module dependencies, which can be highly code dependent from a syntactical perspective. Feature dependencies can relate to a logical dependency, e.g. one module writes a particular configuration file or entry in a configuration file that is required by another module. In this example, OSGI-based semantics may not capture the dependency.

A strong relationship can exist between runtime dependencies and installation artifacts and this can manifest itself in the relationship between feature and component dependencies. Installation dependencies can be a derivative of runtime requirements. The installer build process can automatically percolate Feature Definition dependencies to relevant component entries in the Product Model. Component dependencies can drive installation file processing.

Features can be defined in a separate model. Feature references can be coded under the component element in the GPR provide linkage between the Product model and Feature Model. Components can be composed of features.

A module can be an OSGi-compliant file or other archive that can be directly loaded and used. For example, a module may be an OSGi bundle, a jar intended for use on the classpath of a Java-based runtime system or a WLS shared library. A module can contain an embedded version in its file name. Each module can provide very granular functionality.

A shared module can provide common functionality targeted for use by two or more products. Shared modules can install under the Home directory, rather than a specific product directory. The installer can track usage for each shared module via a reference count, since multiple products can depend on the same module. Reference counting can prevent premature un-installation of shared modules required by an active, installed product. A separate file can contain reference counts for all shared modules installed into a given Home directory. This file can reside either under the Home directory or a well-known sub-directory of the Home directory. A separate file tracking all shared modules with associated reference counts, rather than storing associated data in an existing metadata file can allow for efficient access. In theory, reference counts can be tracked in the Feature Definition file, but this can require traversal of all Feature Definition files during un-installation processing.

The GPR can contain definitions for supported Java Virtual Machine (JVM) versions per product release. Each JVM entry can contain a definition of supported OS/architecture platforms.

The JVM definition can be a peer to component, rather than appearing as a component. There are several factors that drive this distinction. A separate versioning system can apply for the JVM and version upgrades and patches are not managed via the same mechanism as other product artifacts. Some products include multiple JDK's, including JDK's supplied by other vendors. Lastly, JDK/JRE installation can require different handling from a technical standpoint, where native compression routines are required to preserve symbolic links for some platform. Considering these factors, the JVM/JDK/JRE need not be consistent with other product artifacts and as such, a separate installation paradigm applies.

Additional JVM/JDK/JRE information can be captured in a separate model outside of the GPR, embodied in a global XML file (jvm.xml). The model can include detailed version and vendor information, along with meta-data used to construct the JVM from constituent parts, e.g. tools versus the JVM library.

Figure 5A:
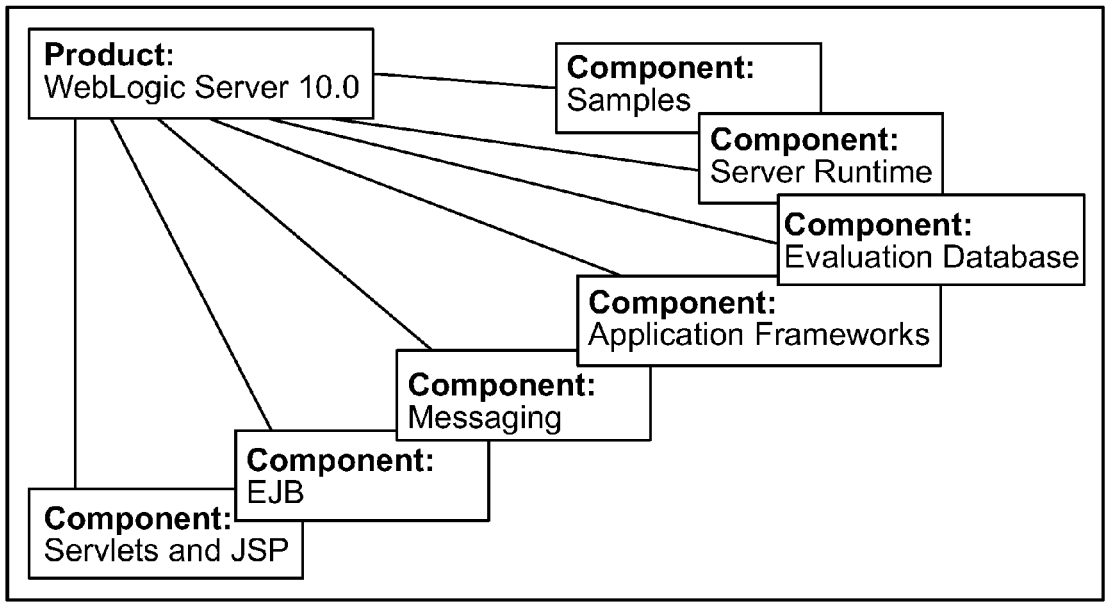

FIG. 5A shows an exemplary product to component mapping.

Figure 5B:
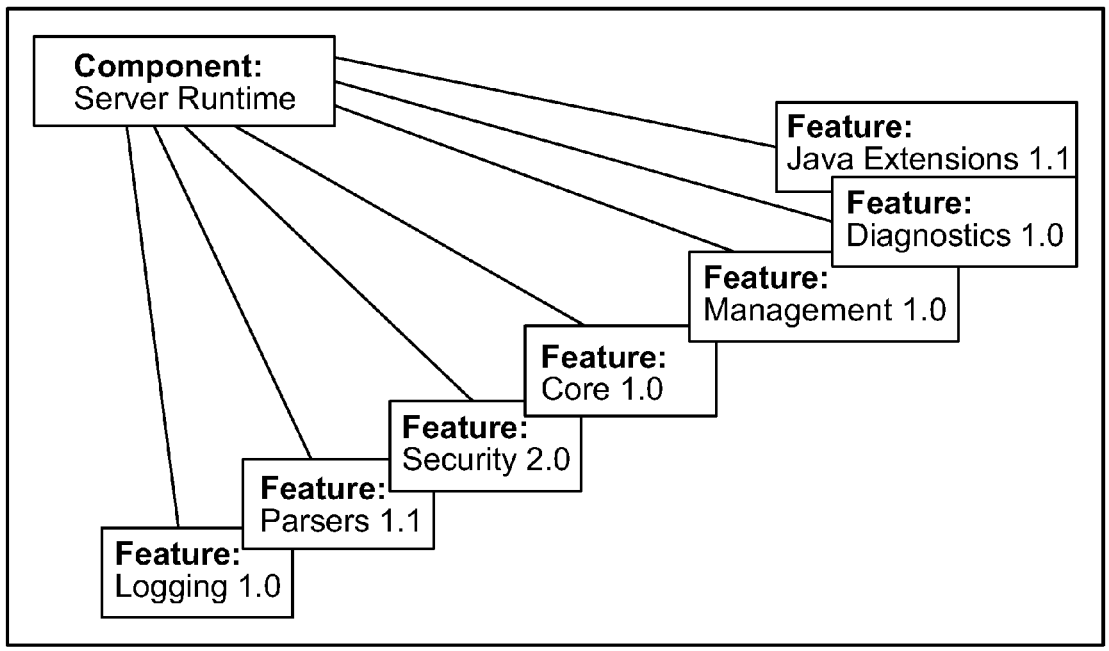

FIG. 5B shows an exemplary component to feature mapping.

FIG. 5C shows an exemplary feature to module modeling.

FIG. 6 shows an exemplary Product Provisioning Architecture. The implementation of the Global Product Registry (GPR) and Home Registry File include:
  Create a new registry.
  Provide synchronization routines to preserve old registry for prior installers.
  Modify internal data structures and API's throughout the installation framework and public interfaces exposing related metadata.
    Include review of Maintenance Pack Installer to ensure preservation of current conditional installation and dependency enforcement processing, and appropriate handling of shared modules.
  Modify internal data structures and API's throughout the Patch Management System framework. Review processing associated with command line usage to ensure semantics are preserved.
  Modify internal data structures and API's throughout the Configuration Wizard framework, specifically concentrating on component selection. A mapping to rationalize the current and new Product Provisioning Models can be required.
  Encrypt registry, providing accessors and mutators.
    Business rationale: Filter sensitive data and protect from manipulation and external dependencies.

Implementation of the Product Alias can:
  Change installer displays to reflect the high-level alias for customer consumption.
  Change the installer component selection panel to display product/component hierarchies rather than component/sub-component hierarchies.
  Change the installer product directory selection panel to allow specification of multiple product directories. Allow for a default product directory to apply across two or more products, based on optional attributes in the GPR. Note that this can require tight coordination across teams to ensure namespace protection of artifacts not containing an embedded version in the name of the associated directory or archives
  Change product/component selection displays in Smart Update (including SP/MP and Patch Management sections).
  Change product/component selection displays in the CCE Patch Management tool.
Feature and Dependency Processing can be implemented by:
  Modify dependency graph and provide new graph traversal and helper routines.
Shared Modules can be implemented by:
  Provide reference counting.
  Institute File Definition model changes and install build routines.
Maintenance Pack Installer can be implemented by:
  Review installer to ensure preservation of existing functionality with the new Product Provisioning Model.

The Core Engine can specify the syntax and semantic for shared module versions (OSGi bundles). In one embodiment, the paraphrased version syntax can be defined as [major-release].[minor-release].[maintenance-pack].[sequential-patch-number].

The Patch Management System can provide support for multiple patch types/methods relevant to module patching. Business and technical use cases along with policy can drive selection of the most appropriate method. Complicating the picture, module usage by the Core Engine can differ significantly from usage by WebLogic Server and dependent products. Increasing the complexity even further, WebLogic Server can also support library modules, which have special requirements for naming and versioning as described in the Patch Management—Shared Archives specification.

The Patch Management System can generate a random and unique Patch ID for each created patch. The random nature of the ID can support either a "one-off" or rolling patch model. Rolling patch semantics can be communicated to the customer via the Patch Description field and further clarified by using UI characteristics of the Smart Update Tool that depicts Critical versus Optional patch groupings.

For shared modules consumed by the Core Engine, a complete replacement patch type can be used. In one embodiment, the module name can change in the fourth (patch) position of the embedded version string. Although classified as a replacement patch type, from a file system perspective, this can involve installing a new module. This patch method can hold the greatest negative impact for patch repository footprint, customer system footprint, and any operation requiring transport of the patch or patchsets containing multiple modules. Further it may require additional manual handling by the customer to load the new patch module for runtime usage.

A second viable model for shared module patching involves replacement patches via injection, also supported by the Patch Management system. This method addresses the footprint issue and provides support for a "one-off" model. However, this would preclude use of signed modules and it appears to force global uptake of patches by all products dependent on the target module. The latter point may be addressable via custom profiles.

The Patch Management System can provide support for other patch installation patch types, e.g. classpath patching, path and libpath patching, but these are not currently relevant to the module discussion. The diversity of patch types can provide flexibility for several different support models, e.g. one-off patches, full rolling patches and rolling patches for a particular class of patches and are mentioned here for completeness.

A Feature/Module Runtime Registry API can provide location independent access to product module registries and the means to start groups of modules using customer-friendly semantics. The initial consumer of the API can be the Core Engine Launcher, but the interface and implementation can be generic, allowing potential use by any engine or server predicating system start on modules.

The API can provide the following functions:
Returns launcher object
  Artifacts constituting the launcher use the same feature and version paradigm applicable to common modules, facilitating a normalized interface.
  The interface returns the highest version of the launcher
Returns module list
  The module list contains module objects providing detail about modules, e.g. location, based on the feature list supplied in the request
  Specific feature versions are not required as the API detects multiple versions of a specific feature, returning an exception in this case.
  The list is ordered based on normalized start level.
Returns install directories associated with started products
Returns artifacts available for certain data categories, e.g. configuration data, for started products
  Artifact categories are associated with specific locations in product directories. Categories and associated locations are loosely coupled via a property file in a well-known location relative to a product directory. Product teams can manipulate the properties file, providing configuration flexibility.
Returns Home directory The API can provide a factory method returning a configuration object. The configuration object can provide a method that returns a module list based on supplied parameters including product, component and features. The high level parameters, e.g. features, used in the interface insulate customers and internal developers from having to understand and specify the full set of modules upon which they are dependent. Product teams with intimate knowledge of their modules can group these together under intuitive features. As described earlier, components can be composed of, i.e. map features. Components in turn belong to products in the Product Provisioning Model hierarchy.

The API can normalize module start levels across products. Module start levels can be defined by each development team can be relative within a product. Creation of static module lists with start levels normalized across all product permutations can be extremely complex, error prone and require constant maintenance. Instead, this API can use a feature dependency graph to create a global module start order spanning products.

The archive can contain implementation classes for the API on the primordial classpath, i.e. the same classpath used to start the microkernel and launcher. This allows bootstrap of the launcher and ensures knowledge of the Home directory location. The Home directory can be the root of all critical bootstrap meta-data.

The feature dependency graph used by this exemplary API can support "and" and supports "or", but need not support "not". Enforcement of mutual exclusivity can be achieved by a separate exclusion map, i.e. the Feature Exclusion Model. This can be applied after graph operations and never changes the graph; heuristic conditions can be surfaced as exceptions. In one example, only a single version of a given feature is allowed in a list of features to start.

Software can incorporate a modular approach to developing and distributing software. Modules can be shared by multiple products. Further, the paradigm for loading modules into runtime containers differs between the software products.

Software customers can be familiar with a style of patching referred to as "classpath" patching. Classpath patching enables very granular patching of artifacts with a corresponding small download footprint.

The Core Engine can be based on a framework for managing applications specified by an open standards organization known as the Open Services Gateway initiative (OSGi). This framework need not support deterministic loading of duplicate classes spread across multiple jars/modules. Consequently, in one embodiment, Core Engine patches are delivered via a complete module. The usability for consumption of patches in a Core Engine environment can approximate that for other products and patch types, with reasonable latitude provided for intrinsic technical characteristics of OSGi-based module launching.

The patch creation process can integrate intuitively with the existing tools and systems. Module patching need not require duplication of effort to accommodate the two runtime methods described above.

A "module" patch type can be used in the Patch Management System to accommodate patching of entities referred to as modules or bundles.

The source artifact for inclusion in the patch can be a module or modules. Modules can be selected from the file system via a file system tree view in a similar fashion to selection of archives for patches of the type "classpath". The selected archives can be then targeted to module entries. Each module entry can consist of a module name with an embedded version in the name. Targeting can involve a user interface that enables association of the source archive with a target module name.

In one embodiment, when creating a module patch, two options can be presented to the software design engineer for selection in the user interface. In one example, at least one of the options must be selected and both can be selected. The options are:
  "Load via classpath"
  "Load via OSGi"

Similar to classpath patches, only changed artifacts need be included in the patch archives All other aspects of patch creation align with processing for other existing patch types.

The patch payload for module patches can closely mirror that of classpath patches. Installation of module patches for classpath loading can be similarly indistinguishable from pure classpath patches. However, a module patch can differ in its ability to create a patch for consumption by an OSGi launcher.

Artifacts can be included in the patch classpath using the existing patch management system mechanism applicable for classpath-based patching. This can provide continuity in processing for existing customers.

OSGi does not have the ability to deterministically load the same class from multiple jars/modules. Instead, a complete module containing patched classes can be provided. The following steps can create a complete module on the target system using essentially the same patch payload created for classpath patches.

1. Duplicate the target module residing on the customer's system, placing this in the default patch profile, or patch profile explicitly selected by the customer. Note that the process of duplication does not result in a file name change. This ensures that no module references require modification. The use of patch profiles and Patch Management System tracking functions can eliminate the need to modify module name or embedded version.
2. Inject artifacts (classes) from the downloaded patch payload into the duplicated module.
3. Track artifacts injected into the patched module by populating entries in the patch backup definition file. This file is located in the patch directory specific to the product/release/maintenance pack level targeted by the patch. Track the sequence of patches applied to the module. The logic supporting sequence tracking must handle the use case where a customer performs un-install of a patch that is not the latest patch applied. For example, given 5 patches applied to a specific module, the customer performs un-install on the second of the 5 patches applied from a chronological perspective. Note that this approach doesn't require physical backup of the artifacts in the patched module, as the injected artifacts still reside in the patch directory. The control information residing in the patch backup definition file together with the ability to re-inject patches into the module supports all known un-install scenarios.
4. Update the patch module list under the "patch" sub-directory of the common modules directory located in the Home directory. This module list contains entries for each patched module and identifies the product/release/maintenance pack association for the module, along with the patch profile under which the module resides.

Module patches can be applied to custom profiles, consistent with other patch types.

Runtime processing of module patches can differ depending on the system used to load modules. Similar to patch installation, runtime processing of module patches loaded via the classpath can mirror processing of typical classpath patches. The customer should not perceive a difference unless they closely inspect internal meta-data.

Modules delivered via the Patch Management System and loaded using the classpath function identically to classpath jars delivered under the current version of the Patch Management System. Custom profile handling and processing can be similarly consistent.

Different processing applies to modules delivered via the Patch Management System and loaded by the Core Engine OSGi-based Launcher. The Launcher can derive a list of modules to start by processing feature requests using a Feature Registry API. This is the Launcher module start list. For context, feature sets (also referred to as features) are versioned sets of functionally related modules that can express dependencies on other features. Features can also have product affinities.

After compiling a list of modules and prior to returning this to the Launcher, the Feature Registry API can compare the patch module list, created during patch installation, to the Launcher module start list. If a module matches on version and product association, the entry from the patch module list can replace the corresponding entry in the Launcher module start list. Note that the module version is embedded in the module jar file name. The file object representing the patched module can be created using information from the module start list. Patch directories reside under the Home directory and are qualified by product/release/maintenance pack.

To accommodate use of custom patch profiles, the Launcher can add a new optional flag to allow the customer to select a custom patch profile. Concurrently, the Feature Registry API can provide the ability to optionally specify a custom patch profile applicable to module requests. In one embodiment, when handling requests involving custom patch profiles, two differences apply to the processing described above.

Only entries identified as belonging to the specified patch profile are selected for processing.

The file object representing the patched module is created using a path that includes the custom patch profile directory tree.

Module patch un-installation can require additional handling to reverse processing and related meta-data specific to OSGi runtime requirements as compared to a pure classpath patch.

Artifacts can be removed from the patch classpath using the existing Patch Management System mechanism applicable for classpath-based patching.

The following steps can change the state of the target system to remove any artifacts or meta-data relating to the patch being un-installed. Note that the state need not be restored to that of the system prior to the original patch install, as other patches may have been installed during the interim between patch install and un-install. Standard patch dependency checking can apply prior to initiating patch un-installation.

In one embodiment:
1. When un-installing the only patch currently applicable to a given module, remove the patched module from the system.
2. If multiple patches are associated with a given module, determine if the patch being un-installed is the latest patch applied to the module. If it is the latest patch, re-inject artifacts from the immediately prior patch.
3. Modify the patch backup definition file to show an updated sequence of patches applied to the target module. If un-installing a patch that is not the latest patch applied to the module, do not modify the patched module. Remove meta-data in the patch backup definition file that relates to this patch in the sequence of patches applied to the module.
4. Remove the corresponding entry in the patch module list under the "patch" sub-directory of the common modules directory located in the BEA Home.

For support and debugging purposes, we can provide the ability to view a snapshot of all artifacts patched in a given module. Information includes the artifact name and associated patch identifier. The Patch Management System's command line utility can invoke this function.

A patch attachment facility can:
Provide a mechanism to add patch installation as a loosely coupled yet cohesive part of standard installation.
Provide an ability to easily configure this option as part of routine meta-data modifications to install projects.
Build Activation can:
Provide ability to enable patch attachment facility via build/project file switch.
The XML file embodying the installer patch model can be located in a well-known location in the install build directory structure.

The installer patch model's XML file can be referenced from a build/project file variable.

Patch install model and usage can:

Provide ability to specify patches with component relationships via schema-based model exposed in XML. For purpose of this document, we'll refer to the model as the installer patch model.

Conceptually, patch installation can be filtered at two levels, execution level and individual patch level.

Execution Level—this level simply determines if a set of patches should be evaluated for installation.

The list of patches can be scoped at a component level.

Multiple components and associated patch lists can be included as part of the single installer patch model instance.

Patches listed under a given component are evaluated if the component is already installed on the system or has been selected during the current installation session.

Individual Patch Level—this level can assume completion of the Execution Level check and that the check indicates to evaluate individual patch entries for installation Each patch entry can identify the patch ID.

When the installer is built, the patch ID can be used to query the Patch Catalog to extract the product to which the patch applies. Patch meta-data is updated to make this information available to the installer at runtime.

The Patch Management System need not associate patches with installed components, thus we can check against product when determining if it is appropriate to install a patch, i.e. whether the patch application is meaningful given installed products on the system. An alternative to this paradigm is to require a dependent component semantic in the install patch model. Weighing likelihood and ramifications of installing a patch that is effective only for an optional component that is not installed on the target system, although the parent product is installed, versus a requirement to manually identify dependencies in the install patch model, the better design choice appears to be automatic detection of product rather than checking component and requiring that this be included in the patch install model Ideally, the patch ID can be used to query the Patch Management System to determine if the patch is already installed. However, this information is required relatively early in the installation process, possibly before the Patch Management System has been installed on the system. To determine if the patch has already been installed, the installer should first check if the product to which the patch applies has been installed; if not, assume the patch has not been installed. Otherwise, the product uninstall definition can be inspected to determine if the patch was installed via the installer invoked patch process. If the patch is found in the uninstall definition, the definition is updated to reflect newly installed components that require the patch. If the patch was not found in the uninstall definition, assume it is not installed. Note that this might select patches that have already been installed manually by the administrator, a situation that will be detected later. If the patch is installed but not via the installer invoked patch process, the patch entry can be bypassed, i.e. not processed for patch installation.

The patch ID can be used to query the patch Management System to determine the product associated with this patch.

The Patch Management System need not associate patches with installed components, thus we can check against product when determining if it is appropriate to install a patch, i.e. whether the patch application is meaningful given installed products on the system. An alternative to this paradigm is to require a dependent component semantic in the install patch model. Weighing likelihood and ramifications of installing a patch that is effective only for an optional component that is not installed on the target system, although the parent product is installed, versus a requirement to manually identify dependencies in the install patch model, the better design choice appears to be automatic detection of product rather than checking component and requiring that this be included in the patch install model.

If the product that a patch applies to is already installed on the system or has been selected during the current installation session, the patch is selected for installation.

Once the patch is successfully installed via the installer invoked patch process, an uninstall definition can be created, including:

Patch ID

Evaluation level component

Individual patch level product

If the patch has already been installed via the installer invoked patch process, the uninstall definition for the patch should be updated to reflect another individual patch level component association.

The installer patch model can provide the ability to define the order in which each patch is applied relative to the full list of patches. Patch ordering can be independent of component association.

Patch payloads can be packaged with the components that require them. They are copied to the patch cache directory via the normal file copy task.

Client libraries required for the patch attachment facility are installed with a common component and will be dynamically added to the installer class path by a task that runs after the file copy task.

Patch installation can be tracked as part of the standard progress monitor and UI.

Only begin and end events need be tracked as expected duration is limited. If use cases determine otherwise, appropriate events can be identified such that progress monitoring can reflect actual progress more effectively.

Patch status analysis (whether patches should be applied) can be split from the actual act of applying patches during installation. This allows conditional inclusion of progress monitoring for this function. Dynamic modification of the progress monitoring process can be accomplished via several methods. The planned implementation method is unspecified at this point and is a lower level implementation detail.

Patch installation can be seamless, i.e. outside of inclusion in standard install progress monitoring no other UI elements should be affected.

Embodiments of the present invention can include computer-based methods and systems which may be implemented using conventional general purpose or a specialized digital computer(s) or microprocessor(s), programmed according to the teachings of the present disclosure. Appropriate software coding can readily be prepared by programmers based on the teachings of the present disclosure.

Embodiments of the present invention can include a computer readable medium, such as computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling both the hardware of a computer, such as general purpose/specialized computer(s) or microprocessor(s), and for enabling them to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer-implemented method for transmitting the code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

The invention claimed is:

1. A computer-based system comprising:
a computer, including a computer readable storage medium and processor;
a patch management system, executing on the computer, which can load one or more patches to a software program, wherein each patch being couple with metadata specific to the patch and a patch ID which the patch management system uses to identify the patch, wherein the patch management system loads the one or more patches according to
an execution level adapted to determine if a set of patches should be evaluated for installation, and
an individual patch level adapted to evaluate individual patch entries for installation;
an install registry comprising dependency data which indicates which software components are stored on a system and tracks software component dependencies, wherein the software component dependencies include an indication of which software components are to be loaded together and which software components conflict;
a global product registry which indicates the software component dependencies of a software product line and provides the software component dependencies to the install registry;
a patch catalog which indicates the patches and patch dependencies; and
an installer to install the patches and the software components of the software program according to the evaluated set of patches and the evaluate individual patch entries, the installer adapted to interpret the dependency data provided by the install registry and the metadata couple to the patch to determine which patches and which software components are to be loaded, and, in response, to instruct the patch management system to automatically load the determined patches and the software components to the software program according to the software component dependencies and the patch dependencies.

2. The system of claim 1, wherein the patch management system also has a graphical user interface to get user input to load the patches.

3. The system of claim 1, wherein the patch management system updates version information based on the loaded patches.

4. The system of claim 1, wherein the software components and the patch are loaded in a combined operation.

5. The system of claim 1, wherein the metadata indicates what patches to load.

6. The system of claim 1, wherein the metadata is used to determine what patches to place in an install package.

7. The system of claim 1, wherein the metadata is a XML file.

8. The system of claim 1, wherein the patch management system uses the patch ID to determine the software product line associate with the patch.

9. The system of claim 1, wherein the patch dependencies include an indication of which patches are to be loaded together and which patches conflict.

10. A non-transitory computer readable storage medium comprising instructions stored thereon which, when executed by a computer, cause the computer to perform the steps comprising:
provide a patch management system which can load one or more patches to a software program, each patch associated with metadata specific to the patch and a patch ID which the patch management system uses to identify the patch, wherein the patch management system loads the one or more patches according to
an execution level adapted to determine if a set of patches should be evaluated for installation, and an individual patch level adapted to evaluate individual patch entries for installation;

indicate, by an install registry, which software components are stored on a system, and tracks software component dependencies, wherein the software component dependencies include an indication of which software components are to be loaded together and which software components conflict;

indicate, by a global product registry, the software component dependencies of a software product line and provides the software component dependencies to the install registry;

indicate, by a patch catalog, the patches and patch dependencies; and install the patches and the software components of the software program according to the evaluated set of patches and the evaluate individual patch entries, by the installer, the installer adapted to check the install registry and the metadata couple to the patch to determine which patches and which software components are to be loaded, and, in response, to instruct the patch management system to automatically load the determined patches and the software components to the software program according to the software component dependencies and the patch dependencies.

11. The non-transitory computer readable storage medium of claim 10, wherein the patch management system also has a graphical user interface to load the patches.

12. The non-transitory computer readable storage medium of claim 10, wherein the patch management system updates version information based on the loaded patches.

13. The non-transitory computer readable storage medium of claim 10, wherein the software components and the patch are loaded in a combined operation.

14. The non-transitory computer readable storage medium of claim 10, wherein the metadata indicates what patches to load.

15. The non-transitory computer readable storage medium of claim 10, wherein the metadata is used to determine the patches to install into an install package.

16. The non-transitory computer readable storage medium of claim 10, wherein the metadata is a XML file.

17. The non-transitory computer readable storage medium of claim 10, wherein the patch dependencies include an indication of which patches are to be loaded together and which patches conflict.

* * * * *

UNITED STATES PATENT AND TRADEMARK OFFICE
CERTIFICATE OF CORRECTION

PATENT NO. : 8,589,903 B2  
APPLICATION NO. : 12/127950  
DATED : November 19, 2013  
INVENTOR(S) : Felts Page 1 of 1

It is certified that error appears in the above-identified patent and that said Letters Patent is hereby corrected as shown below:

On the Title Page

On page 2, column 2, References Cited under "Other Publications", line 15, delete "developerworks/librarv/" and insert -- developerworks/library/ --, therefor.

In the Specification

In column 8, line 14, delete "archives" and insert -- archive. --, therefor.

In column 10, line 56, delete "archives" and insert -- archive. --, therefor.

Signed and Sealed this  
Third Day of June, 2014

Michelle K. Lee  
*Deputy Director of the United States Patent and Trademark Office*